United States Patent [19]
Ankersmit et al.

[11] Patent Number: 5,669,216
[45] Date of Patent: Sep. 23, 1997

[54] PROCESS AND DEVICE FOR GENERATING MECHANICAL ENERGY

[75] Inventors: Hendrik Jan Ankersmit, Schiedam; Rudolf Hendriks, Velp; Leo Jozef Maria Joannes Blomen, Voorschoten, all of Netherlands

[73] Assignee: Mannesmann Aktiengesellschaft, Dusseldorf, Germany

[21] Appl. No.: 415,582

[22] Filed: Apr. 3, 1995

Related U.S. Application Data

[63] Continuation of Ser. No. 917,075, filed as PCT/DE91/00064, Jan. 18, 1991 published as WO91/11597, Aug. 8, 1991, abandoned.

[30] Foreign Application Priority Data

Feb. 1, 1990 [DE] Germany .................. 40 03 210.8

[51] Int. Cl.$^6$ ............................................. F02G 3/00
[52] U.S. Cl. ................. 60/39.02; 60/39.04; 60/39.12
[58] Field of Search ..................... 60/39.02, 39.04, 60/39.12

[56] References Cited

U.S. PATENT DOCUMENTS

| | | | |
|---|---|---|---|
| 2,621,475 | 6/1952 | Loy | 60/39.04 |
| 3,167,913 | 2/1965 | Muhlberg et al. | 60/39.02 |
| 3,462,948 | 8/1969 | Scholz | 60/39.02 |
| 4,184,322 | 1/1980 | Paull et al. | 60/39.12 |

FOREIGN PATENT DOCUMENTS 2721379  11/1977  Germany .................. 60/39.12

Primary Examiner—Charles G. Freay
Attorney, Agent, or Firm—Cohen, Pontani Lieberman & Pavane

[57] ABSTRACT

A process for the continuous conversion of energy chemically bound in a starting fuel based on C-H compounds into usable mechanical energy. For this purpose, a gas turbine is used and in order to obtain high mechanical efficiency the combustion is effected at least partially with a fuel obtained from the starting fuel by endothermic reaction, the heating of the reaction space for the endothermic reaction being effected either by compressed combustion air, which has been heated by the exhaust gases, or by the hot exhaust gas itself.

15 Claims, 2 Drawing Sheets

PROCESS AND DEVICE FOR GENERATING MECHANICAL ENERGY

This is a continuation, of application Ser. No. 07/917, 075, filed as PCT/DE91/00064, Jan. 18, 1991 published as WO91/11597, Aug. 8, 1991, now abandoned.

BACKGROUND OF THE INVENTION

1. Field of the Invention

The invention is directed to a process for generating mechanical energy by a continuous conversion of energy which is chemically bound in a starting fuel based on C—H compounds. The process includes compressing combustion air and obtaining drive energy for the compression of the combustion air from a compressor drive gas turbine unit through which at least the volume flow of the compressed combustion air is conducted accompanied by a partial expansion. The hot exhaust gas resulting from the combustion of fuel with the compressed combustion air is expanded in a gas turbine which generates at least a portion of usable mechanical energy. Residual heat of the exhaust gas flowing out of the gas turbine is used for heating the media used in the process. The starting fuel is converted into a converted fuel with a higher absolute thermal value by an endothermic reaction in a reaction space. The combustion is effected with or without the addition of starting fuel by using the converted fuel, wherein the entire quantity or at least a predominant quantity of the individual combustible components of the converted fuel which are produced in the conversion are still contained in the converted fuel to be burned. The reaction space for the endothermic reaction is heated either by means of the compressed combustion air which was previously heated by indirect heat exchange of the hot exhaust gas from the combustion to a higher temperature level, or by means of the total flow of the hot exhaust gas generated in the combustion. The invention is also directed to a device for implementing the process.

2. Description of the Related Art

In the most thermal power stations electrical energy is generated by first producing superheated steam by means of burning fossil fuels in boiler installations. The steam is expanded in steam turbines and converted into mechanical energy. The steam turbines are coupled with electrical generators so that this mechanical energy is converted into electrical energy. This is effected with an efficiency of well over 90%. On the other hand, the efficiency of the conversion of the energy chemically bound in the utilized fuel into mechanical energy is quite modest, since the turbine efficiency is at most approximately 37% even in large turbines and losses in the heating boiler must also be taken into account. Therefore, in many cases only approximately 35% of the heat released during combustion could previously be effectively used for generating electricity, while approximately 65% was lost as exhaust heat or could only be used purely for heating purposes.

A considerable increase in overall efficiency was achieved in recent times by employing a combination of gas turbines and steam turbines for converting the thermal energy into mechanical energy. The hot combustion gases are first expanded in gas turbines and the heat of the exhaust gas of these gas turbines is used for generating the steam for the steam turbines. Additional possibilities for improving efficiency consist in that the expanded steam flowing out of a steam turbine is guided back into the combustion chamber of the gas turbine connected upstream and a greater volume flow is thus generated for driving the gas turbine. These steps have made it possible to raise the overall efficiency of the conversion of thermal energy into mechanical energy in larger plants (over 50 MW) in an order of magnitude of approximately 40 to 50%.

Such a combined gas/steam turbine process is based e.g. on DE 33 31 153 A1. Conventional "flowing" fuels, i.e. liquid or gaseous hydrocarbons, are used to produce the necessary hot combustion gases for the gas turbine. In order to prevent the formation of nitrogen oxides to a great extent, the combustion chamber temperature is lowered by introducing a portion of the steam generated by the heat of the gas turbine exhaust gas into the combustion chamber. At an overall output of 300 MW the achievable efficiency for this process is given at 48%.

The periodical VGB Power Station Technology [VGB Kraftwerkstechnik] 68 (No. 5, May 1988, pages 461–468) describes a combined gas/steam turbine process in connection with the gasification of coal. The combustible gas produced in the gasification of coal is combusted in a first combustion chamber after purification partially with compressed air. The hot combustion gases produced in this manner are first used for superheating steam for the gasification of coal and for heating the allothermal coal gasification itself before they are expanded in a first gas turbine which in turn drives a compressor for the required combustion air. The other portion of the combustible gas generated in the coal gasification is burned in a second combustion chamber and immediately thereafter expanded in a second gas turbine which is mechanically coupled with another compressor for the combustion air required in the second combustion chamber and with an electric generator for generating electrical energy. The expanded turbine gas of the second gas turbine is used for generating steam before being drained into the atmosphere together with the expanded exhaust gas of the first gas turbine (compressor drive turbine). This steam is expanded in a steam turbine which is likewise coupled with a generator for generating electrical energy. A portion of the steam is coupled out from the steam turbine after partial expansion and then used for the coal gasification after the above-mentioned superheating by the combustion gases of the first combustion chamber.

In this known device, coal is used as a starting fuel which is first made usable for a gas turbine process in that it is gasified beforehand. This conversion is compulsory in technical respects because of the ash portion resulting in the combustion, which would destroy a gas turbine. On the other hand, fuels based on hydrocarbon compounds are in liquid or gaseous form, contain no ash portion and can therefore easily be used immediately in a combined gas/steam turbine process. A characteristic of this known device consists in that the combustion gases are guided in two partial flows which are at first completely independent and are used for different partial processes before being used together for generating steam at the end of the process. The net efficiency of this device is approximately 42% and the internal energy requirement for carrying out the process is approximately 7.5%.

Another combined gas/steam turbine process for generating electrical energy in which a coal gasification is first carried out is known from U.S. Pat. No. 4,478,039. In this case, the generated gas is burned in a combustion chamber at above atmospheric pressure. The resulting hot combustion gases are then expanded in a gas turbine which drives an electric generator and a compressor for compressing the combustion air. The expanded turbine exhaust gas is used additionally for heating the coal gasification arrangement and for generating steam for the steam turbine process. The steam turbine likewise drives an electric generator. This patent says nothing about the use of starting fuels based on hydrocarbon compounds.

Further, a process and a device for obtaining hydrogen are known from DE 37 40 865 A1. A gaseous starting fuel, that is, a hydrocarbon compound, is converted by steam reformation into a hydrogen-rich gas with an increased absolute thermal value compared to the quantitative flow of starting fuel.

"Absolute thermal value" in this sense does not refer to a thermal value with reference to a unit of weight as is usually the case. Rather, it refers to the total quantity of combustion heat contained in a determined quantity of starting fuel or in a quantity of converted fuel formed by endothermic conversion of the same quantity of starting fuel. That is, in the case of steam reformation the total quantity of converted fuel is considerably increased in a compulsory manner relative to the original quantity of starting fuel by means of the steam portion added during the conversion, so that the weight-related thermal value is even smaller than before, although the amount of heat released during the combustion of the converted fuel has increased.

In order to obtain a pure hydrogen gas, the crude gas generated in this process according to DE 37 40 865 A1 is treated in a purification stage (e.g. pressure exchange absorption system) in which the impurities (e.g. CO, $CO_2$, $H_2O$, unconverted hydrocarbons) are separated out and carried off as an exhaust gas flow. This combustible exhaust gas flow, which also contains a certain residual portion of hydrogen gas in a compulsory manner, is burned with compressed air after being compressed in a compressor to a higher pressure than combustion gas, e.g. in the heating chamber of the indirectly heated steam reformer. Due to the extensive separation of the hydrogen from the crude gas, the absolute thermal value of the exhaust gas flow of the purification stage decreases significantly relative to the absolute thermal value of the crude gas and lies below that of the utilized starting fuel. Therefore, it is often necessary when heating the steam reformer to burn a partial flow of the starting fuel directly therewith. The resulting combustion exhaust gas is guided into a combustion chamber as moderator gas for lowering the temperature after heating the steam reformer, a partial flow of the starting fuel being burned in this combustion chamber with compressed air. The flow of combustion exhaust gases guided out of this combustion chamber is then expanded in a gas turbine. The gas turbine provides the compressor drive energy required in this process and, beyond this, also enables the generation of electrical energy by means of an adjoining generator.

In this known process the conversion of the starting fuel per se is effected only as a result of the intention to generate hydrogen gas which is needed for optional applications outside of this process. There is no suggestion in DE 37 40 865 A1 that such an endothermic fuel conversion could also be advantageous when the converted fuel is to be burned subsequently for the purpose of generating mechanical energy. That is, the combustion of the converted fuel applied in this known process is carried out only with the aim of reclaiming a byproduct. It is important to note that only a part of the combustible components originally contained in the converted fuel is present in the combustion, since the hydrogen portion which constitutes the predominant portion in absolute thermal value has been separated out to a great extent prior to this. For this reason the purely arithmetic ratio of the generated usable mechanical or electrical energy to the quantity of chemically bound energy contained in the utilized starting fuel in this process is also extremely small at less than 10%.

A process and a device for generating mechanical energy from gaseous fuels is known from EP 0 318 122 A2 which forms the generic basis. In this process and device the mechanical energy which can be utilized e.g. for generating current is given off solely by a gas turbine. This gas turbine, which is provided particularly for an output range of 50 to 3000 KW, achieves an efficiency of approximately 42% with reference to the utilized thermal energy (lower thermal value). For this purpose, combustion air is first compressed in a compressor. The compressed combustion air is then heated in an exhaust gas heat exchanger via a first gas turbine which only drives the compressor, partially expanded and subsequently fed to a combustion chamber in which fuel is burned with this combustion air. The hot exhaust gas resulting during this combustion drives a second gas turbine which supplies the actual usable mechanical energy. The still hot exhaust gas flowing from the second gas turbine is used for operating the exhaust gas heat exchanger for heating the compressed combustion air.

Finally, a device is known from U.S. Pat. No. 3,167,913 in which a single combustion chamber is provided which is arranged prior to the compressor turbine, i.e. the high-pressure part, of the entire turbine installation. Such high-pressure devices require that the combustion chamber also be designed for high pressures.

Further, high combustion temperatures are aimed for in order to increase the turbine efficiency so that more harmful materials are also formed. Because of the high compression of the combustion air, high temperatures occur in the compressed combustion air which must be taken into account in turn in the planning of the exhaust gas heat exchanger. This not only increases the costs of the device, but also impairs the overall efficiency.

SUMMARY OF THE INVENTION

The object of the present invention consists in further developing a process and a device of the generic type in such a way that the efficiency of the conversion of the energy contained in a fuel based on C—H compounds (lower thermal value) into mechanical energy is over 50% in small installations (50–3000 KW) and at least 55% in larger installations. In the following, efficiency always refers to "mechanical" efficiency, i.e. the ratio of the generated usable mechanical energy of the turbine to the used energy of the starting fuel (based on the lower thermal value $H_u$).

In accordance with the present invention, the combustion is carried out in two stages. Hot exhaust gas generated in the first stage and having a high excess amount of air is partially expanded in the compressor drive gas turbine and the partially expanded gas is then fed to the second combustion stage with additional fuel, and hot exhaust gas generated in the second stage is expanded in the gas turbine so as to produce usable mechanical energy.

A substantial inventive step consists in that the connection of devices known from EP 0 318 122 A2 is supplemented by a reactor for an endothermic chemical reaction in which the utilized fuel (starting fuel) is converted into a fuel of higher value which is then finally burned with the compressed air from the compressor.

The thermal energy for operating the reactor is preferably obtained from the exhaust gas heat of the exhaust gas flowing out of the gas turbine in which the usable mechanical energy is generated. However, other hot gas flows of the process can also be made use of for heating the reactor. When exhaust gas heat is used for the reactor, this further cooled exhaust gas can be used, e.g. in an exhaust gas heat exchanger for heating the compressed combustion air.

By converting the starting fuel, exhaust heat from the exhaust gas of the gas turbine or another heat flow is raised as it were to a higher "potential temperature level" in a manner similar to that of a heat pump so that this heat can be utilized better in technical respects than heat which is at a lower temperature. This "raising" of the temperature level is effected in the form of an increased absolute thermal value of the new fuel (e.g. $H_2$ and $CO$) formed from the original fuel (e.g. natural gas) during the conversion in the reactor.

The process and device according to the present invention make it possible to systematically intercept and effectively exploit the exhaust heat occurring in the process. It is especially advantageous to carry out the endothermic reaction for generating the higher-value fuel which can be carried out particularly as steam reformation e.g. from natural gas, at comparatively low temperatures. This steam reformation is usually carried out on a commercial scale only at temperatures in the range of 780° to 900° C. According to the invention, it is advisable not to exceed an upper temperature limit of 780° C., or better 700° or even 650° C.

The disadvantage that a deterioration of the conversion rate of the original fuel, that is, an increase in the portion of unconverted fuel, must be tolerated at the lower temperature is more than offset by the advantage of an improved utilization of the exhaust heat of the gas turbine or the heat of another hot gas flow of the process in heating the reactor and a reduction in the temperature of the live steam needed for the endothermic reaction. The reduced temperature level also brings about advantages for the cost of a device according to the invention, since the thermal demands made on the utilized work material are lower than in the prior art.

Another very significant fact consists in that the combustion of the fuel can be influenced, e.g. by spraying water or steam into the combustion chamber or chambers of the device, in such a way that nitric oxide is not formed or if so then only in small quantities. The flame temperature is limited to values of a maximum of 1700° C. (adiabatic flame temperature) and the temperature at the inlet into the gas turbine is limited to a maximum of 1250° C. so that it is possible to implement the process according to the invention in an unusually environmentally friendly manner without necessitating costly denitrifying systems. All this is made possible by integrating the fuel conversion and the generation of mechanical energy from the heat released by the combustion of the fuel according to the invention. This enables a use of exhaust heat flows which is so effective that an efficiency not previously regarded as possible can be achieved. Typical values lie in the range of 50 to 70%, smaller installations being placed in the lower range and larger installations in the upper range. The devices according to the invention are particularly suitable for generating electricity locally, i.e. in proximity to the consumer, and accordingly offer the additional advantage that losses due to the transporting of energy over long distances and/or transforming current can be prevented to a great extent. In large power stations experience has shown these losses to be approximately 10% of the generated electrical energy.

Two main variants are to be viewed as particularly preferred for the process according to the invention. In one main variant, as was already described above, the compressed combustion air is heated in an exhaust gas heat exchanger prior to being introduced into the combustion chamber, the exhaust gas heat exchanger being supplied with the exhaust gas of the gas turbine which supplies the usable mechanical energy. The exhaust gas heat exchanger is preferably constructed as a recuperator.

The greater the amount of heat to be exchanged in this recuperator per unit of time, the sharper the increase in the constructional volume of this heat exchanger unit. In larger devices of the type according to the invention (in the output range of approximately 50–80 MW), the recuperator is extremely large and correspondingly costly in comparison to conventional device parts. Therefore, the second main variant of the invention in which a recuperator is entirely dispensed with is recommended for larger installations.

In the second main variant, the exhaust gas of the gas turbine is used for generating steam (possibly after the heating of the reactor for the fuel conversion). This steam is superheated by means of a hot gas flow occurring in the process and is then expanded in a steam turbine for generating additional mechanical energy as is known in so-called "combined cycle" power stations. Although the efficiency of the process is somewhat lower in such large devices than would be possible in principle in a construction of the device according to the first main variant, the cost of the device is significantly lower.

DESCRIPTION OF THE PREFERRED EMBODIMENTS

Figure 1:
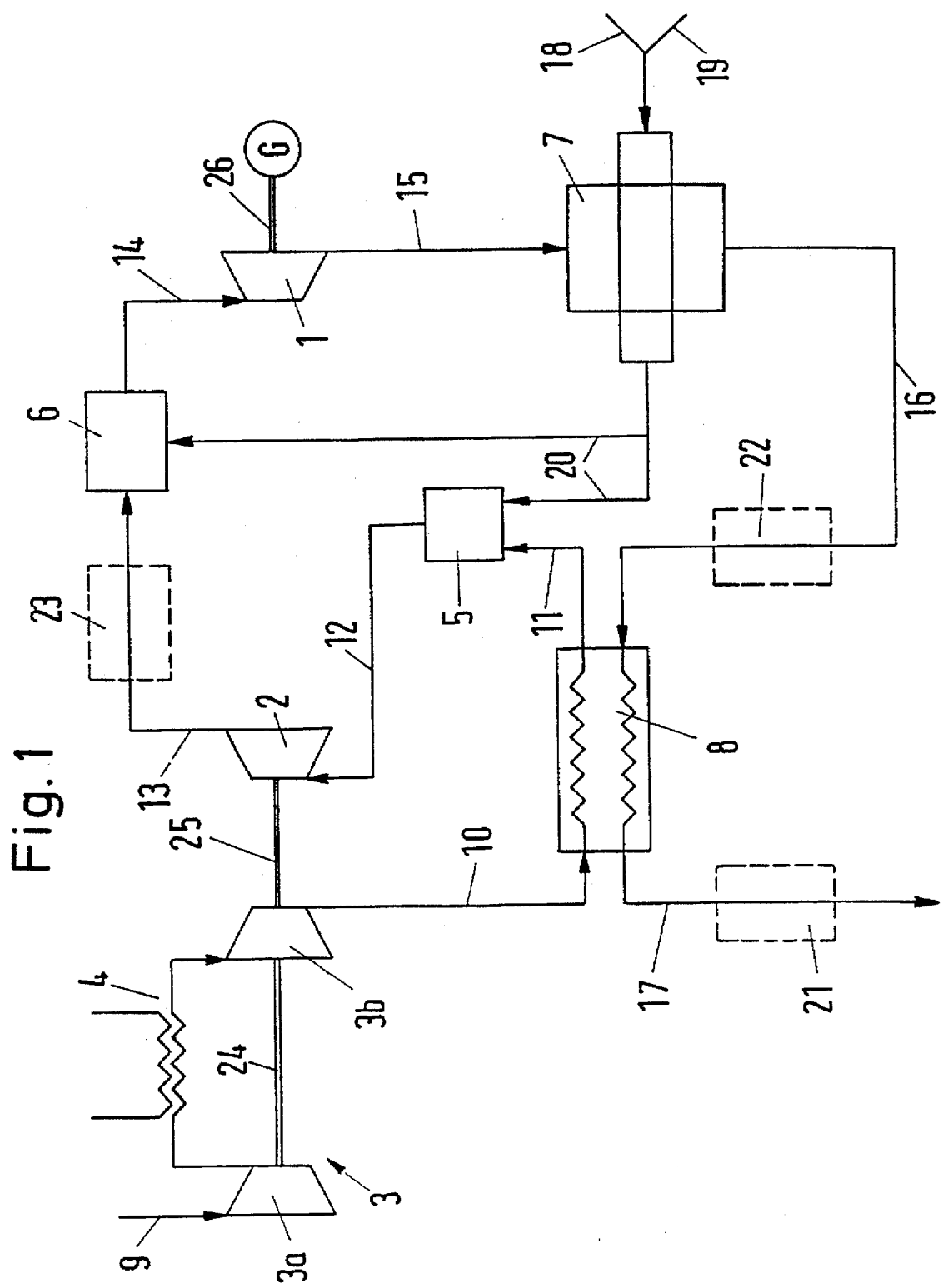
FIG. 1 is a diagram showing a device according to the present invention with recuperator.

In the embodiment of the invention shown in FIG. 1, combustion air is sucked in through a pipeline 9 by a compressor 3a of a compressor unit 3 which has a second compressor 3b. The compressed combustion air is cooled intermediately by means of a cooler 4 and then compressed in the second compressor 3b to an even higher pressure. The two compressors 3a, 3b are mechanically coupled with a compressor drive gas turbine unit 2 via the shafts 24, 25. The compressed combustion air is directed via a pipeline 10 from the second compressor 3b to an exhaust gas heat exchanger 8 constructed as a recuperator and is guided from the latter into a first combustion chamber 5 after being heated by means of indirect heat exchange via a pipeline 11.

A portion of the fuel formed in a reactor 7 from a starting fuel by means of an endothermic reaction arrives in the combustion chamber 5 through the fuel feed line 20 and is burned in the combustion chamber 5. The resulting hot gas mixture which contains excess combustion air in addition to the combustion products is guided through the hot gas feed line 12 to the compressor drive gas turbine unit 2 and, while giving off the drive energy required for the compressor unit 3, is partially expanded and thus somewhat cooled.

This gas mixture which is still hot then arrives in a second combustion chamber 6 through the hot gas feed line 13. Fuel is likewise introduced into this second combustion chamber 6 via a branch of the fuel feed line 20 and is burned with the excess air so that the exhaust gas is brought to a higher temperature again as a whole.

The hot exhaust gas resulting from the combustion is directed through a hot gas line 14 to a gas turbine 1 which generates usable mechanical energy and after being expanded is drained from the latter through the exhaust gas line 15. The compressor drive gas turbine unit 2 and the gas turbine 1 can be arranged on a common shaft and can even be constructed as a single turbine unit under certain conditions in order to simplify the entire arrangement. When there is a plurality of compressor stages, it is also possible for these compressor stages to be driven in part by the gas turbine 1. The compressors and turbines can accordingly be optimally adapted to one another.

By spraying e.g. water or steam into the combustion chambers 5, 6, the adiabatic flame temperature can be limited to under 1700° C. and the temperature at the inlet into the gas turbine 1 can be limited to values of approximately 1250° C., in many cases even to lower values of up to 800° C., at which no appreciable amounts of nitric oxides are formed. In this respect a great advantage of the invention consists in that the formation of nitric oxides is already substantially reduced in any case in that the converted fuel resulting in the endothermic reaction and having a higher absolute thermal value is burned to a great extent instead of the starting fuel. That is, from the beginning (depending on the excess air) there is an adiabatic flame temperature which is 300° to 550° C. lower than the adiabatic flame temperature in a combustion of the starting fuel.

It is also possible to carry out the combustion of the supplied fuel in a single combustion chamber 5 so that the combustion chamber 6 can be dispensed with. When two combustion chambers are used the steps for a directed lowering of the flame temperature can also be limited to the second combustion chamber 6, since the nitric oxides formed in the first combustion chamber 5 decompose again to a great extent as a result of the thermal action during the subsequent combustion. This means that the first combustion can be effected at high exhaust gas temperatures and accordingly with favorable conditions for the compressor drive gas turbine with respect to the highest possible turbine efficiency without ultimately leading to higher $NO_x$ contents. Thus, it is primarily the controlled management of temperature that is of particular importance for the last combustion stage.

The mechanical energy generated during the expanding in the turbine 1 is available for use at the driven shaft 26 and can be used e.g. for driving a generator G for generating electrical current. The exhaust gas which is cooled somewhat during the expanding, but is still hot, arrives in the heating region of the indirectly heated reactor 7 for the endothermic reaction through the exhaust gas line 15.

A new fuel with a higher absolute thermal value is generated from the starting fuel, which has a determined absolute thermal value, by means of this endothermic reaction which e.g. can be effected as steam reformation. A steam feed line 19 into the reaction space of the reactor 7 is shown for the case of steam reformation of natural gas which e.g. is fed through the fuel feed line 18.

As a rule, it is advisable to mix the steam with the fuel beforehand. The generated new fuel, which is a mixture of $H_2$, CO, $CO_2$, unconverted $CH_4$ and steam, is fed from the reaction space into the combustion chambers 5 and 6 via the feed line 20 and is burned there as described above. Of course, it is also possible to mix a portion of the starting fuel with the higher-value fuel and to effect combustion only then in order to optimize the combustion processes (temperature, mass flow) in the combustion chambers 5 and 6. Advisably, a mixture with a portion of at least 50%, preferably even more than 80%, of the converted fuel is used. The less converted fuel contained, the more the efficiency tends to be impaired. The principle that burned fuel has a higher thermal value on the whole than the starting fuel remains true in this case. Of course, a portion of the higher-value fuel can also be coupled out of the process and used in other processes.

In the aforementioned steam reformation of natural gas (substantially $CH_4$) the absolute thermal value of the fuel is increased by approximately 30%. In the case of hydration of the starting fuel toluol, the increase in the thermal value is approximately 15%. Instead of a steam reformation, the endothermic reaction can also be provided e.g. as dehydrogenation. When using ethane as a starting fuel this would bring about an increase in the thermal value of approximately 10 to 20% and with methanol even approximately 20 to 30%. Another example of an endothermic reaction is the steam cracking of optional hydrocarbon compounds (e.g. biogas, LPG, naphtha, kerosine, etc.).

Precisely this last possibility is of interest because it allows alternate use of a plurality of different fuels for generating mechanical energy without having to adjust the gas turbine to a new fuel when exchanging fuels.

The endothermic reaction is carried out if possible at temperatures below 780° C. or, better still, below 700° C. The exhaust gas used for heating leaves the heating region of the reactor 7 through the exhaust gas line 16 at a temperature which is still relatively high and is used according to the invention e.g. for heating the exhaust gas heat exchanger 8 with which the compressed combustion air is heated. The cooled exhaust gas is finally drained from the exhaust gas heat exchanger 8 via the exhaust gas line 17.

In the case of an endothermic reaction in which the use of steam is required, the process according to the invention can be operated as a closed system insofar as this steam can be generated while making use of the available heat in the individual hot volume flows in the process. At least part of the required live steam can also be fed to the reactor 7 externally from optional steam sources in order to achieve an even higher overall efficiency of the process. In the diagrammatic view of the device optional steam generators 21, 22, 23 which can be operated alternately or simultaneously are shown in dashed lines in possible locations. The steam generator 21 is installed at the end of the device in the exhaust gas line 17 and can therefore only generate steam at a relatively low temperature. A heat exchanger for preheating the starting fuel (or a mixture of fuel and steam) or for preheating the feed water for generating steam could also be arranged in this location.

Another possible location for a steam generator 22 is indicated between the exhaust gas heat exchanger 8 and the reactor 7 in the exhaust gas line 16.

A preferred arrangement of the steam generator 23 is between the compressor drive gas turbine unit 2 and the second combustion chamber 6, since this arrangement has a positive effect in terms of a reduction of the combustion temperature in the combustion chamber 6. When a plurality of steam generators 21 to 23 are provided simultaneously, they can be connected in tandem in such a way that steam with a relatively low temperature is generated in one (e.g. 21) and is superheated to a higher temperature in another (e.g. 22 and/or 23). In principle, the exhaust heat occurring by means of an intermediate cooling in the cooler 4 during the compression of the combustion air can also be used for generating steam.

In the diagrammatic view of the device in FIG. 1, the reactor 7 is connected into the exhaust gas line 15, 16 of the gas turbine 1. However, it is also possible to effect the reactor heating by a hot gas flow occurring beforehand in the process. The reactor 7 could therefore also be connected into the lines 11, 12, 13 or 14 in principle. Although the efficiency of the turbines 1 and 2 is lowered by lowering the temperature of the hot gas flow, the $NO_x$ formation is also reduced simultaneously. Therefore the process parameters must be adapted to one another with respect to optimum effect.

In order to start the device from the cold state in which neither a hot gas flow nor sufficiently converted fuel is available it can be provided alternatively or simultaneously that the original fuel (e.g. natural gas) can be introduced, at least temporarily, and burned in the combustion chamber 5 and in the heating region of the reactor 7.

The corresponding separate fuel feed lines (not shown) can also be connected temporarily if the available heating output in these units is temporarily insufficient. Accordingly, the entire operation of the device can be regulated in an extremely simple manner. In order to improve regulation and to optimize the entire system it can be provided in addition that a portion of the energy generated in the gas turbine 2 for the compressor drive is discharged as usable mechanical energy.

Figure 2:
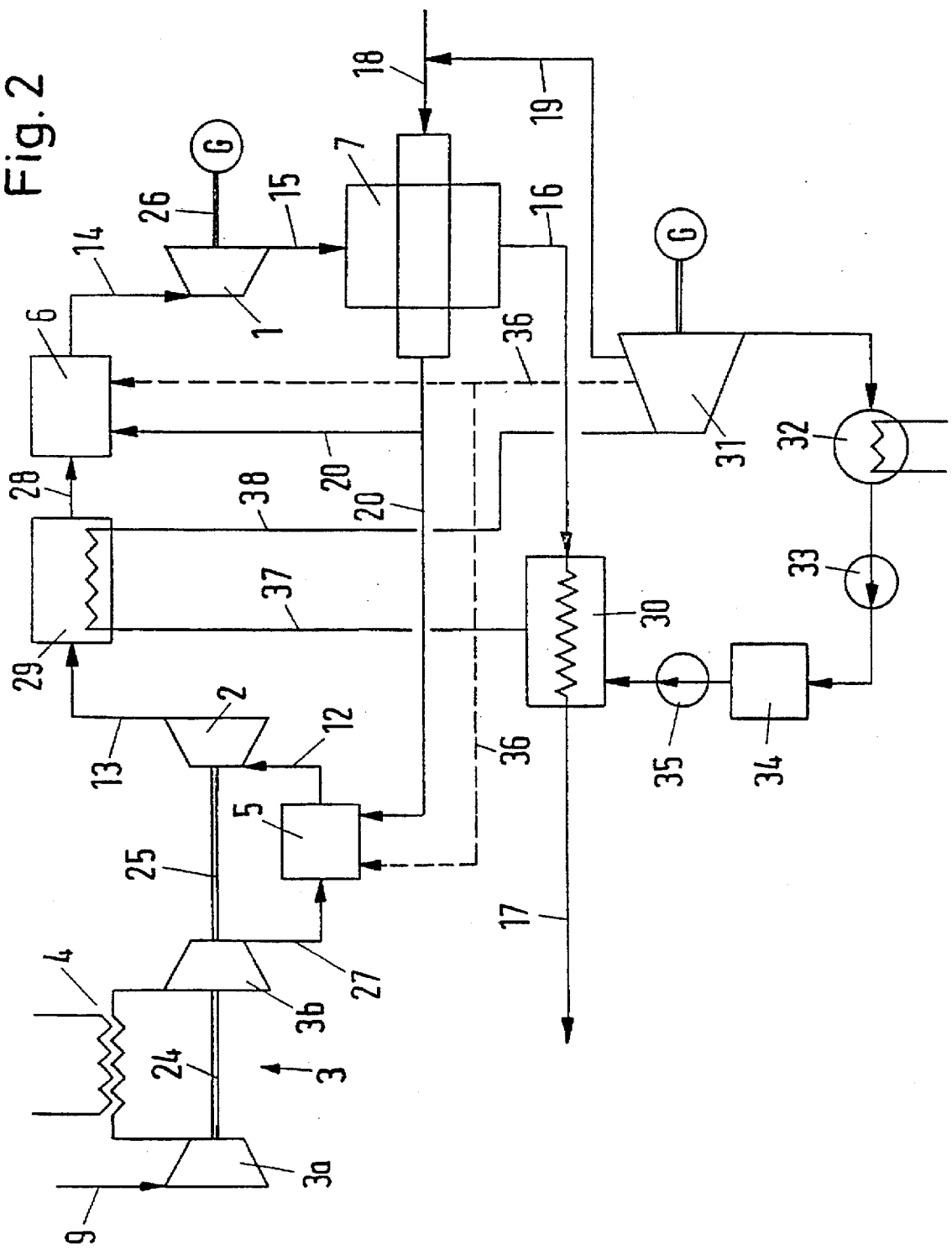
FIG. 2 is a diagram showing a device according to the present invention with steam turbine.

The second main variant of the process according to the invention is shown schematically in FIG. 2. Parts of the device having the same function have been provided to a great extent with the same reference numbers as in FIG. 1. The statements made with respect to FIG. 1 therefore apply in a corresponding sense so that only the differences existing between them need be discussed more closely in the following.

The substantial difference with respect to FIG. 1 consists in that the exhaust gas heat exchanger 8 constructed as a recuperator for preheating combustion air is absent and, instead of this, a system for generating superheated steam is provided which is used on a steam turbine 31 for generating mechanical energy. This steam generating system includes a steam boiler 30 and a steam superheater 29.

The steam boiler 30 is heated by the residual heat of the exhaust gas exiting from the gas turbine 1 after it has passed through the heating space of the reactor 7 and given off additional heat. The generated steam arrives in the superheater 29 through the pipeline 37 and from the latter reaches the steam inlet side of the steam turbine 31 through the pipeline 38. The expanded steam is introduced into a condenser 32 from the steam turbine 31. The condensation pump 33 conveys the condensed water into a gas-removal device 34.

From the latter, the prepared boiler water arrives in the steam boiler 30 by means of the boiler feed pump 35 via a pipeline. The steam/water system is accordingly an extensively closed circuit system. Occurring water losses are compensated for by a water feed, not shown.

These water losses occur particularly when steam is coupled out subsequent to the high-pressure part of the steam turbine 31, as is shown in FIG. 2 by an optional line 36 shown in dashes, and guided into the combustion chambers 5 and 6 for regulating the temperature and increasing the mass flow. The pipeline 19, which should likewise be considered as optional, can couple steam out of the circuit system in the same manner and direct it into the reaction space of the reactor 7. However, this steam could also be generated at other locations in the device, as has already been discussed in more detail with reference to FIG. 1, or supplied externally. The water required for filling the steam/water circuit can be obtained by recycling the condensation from the exhaust gas line 17.

For the sake of completeness, it is noted that the feed line of the compressed combustion air into the first combustion chamber 5 in FIG. 2 is designated by 27 and the hot gas line from the steam superheater 29 to the second combustion chamber 6 is designated by 28.

In principle it is also true for the process variant according to FIG. 2 that the reactor 7 can also be installed at other locations in the hot gas lines. A preferred solution is to exchange the positions of the reactor 7 and the steam superheater 29.

Another advantageous construction of the invention, which is not shown in FIGS. 1 and 2, concerns the use of the hot exhaust gas expanded in the gas turbine 1. Namely, this exhaust gas conventionally contains a considerable $O_2$ content, since the combustion is carried out with an excess of $O_2$. Therefore it can be used e.g. as a cathode gas for supplying $O_2$ to a fuel cell system in which electric current is generated.

In such fuel cell systems it is advantageous to feed the cathode gas at a temperature approximately corresponding to the operating temperature of the fuel cells. Depending on the type of fuel cell system, the operating temperature is at another level. Accordingly, the fuel cell system is connected into the exhaust gas line 15, 16, 17 at a suitable location, i.e. the cooling of the expanded exhaust gas during the heating of other media flows required in the process according to the invention (preheating of air, generation of steam, reformer heating) is carried out up to the level approximately corresponding to the respective desired operating temperature and the exhaust gas flow or a portion of the exhaust gas flow is then introduced into the cathode space of the fuel cell system. The fuel cell system can be supplied with fuel by means of an optional $H_2$ gas source (e.g. pipeline or gas storage). A partial flow of a gas rich in $H_2$ generated in the reactor 7 can also be guided into the anode space of the fuel cell.

The efficiency of the process according to the invention is shown in detail in the following with reference to an embodiment example. This was based on a connection of devices corresponding to FIG. 1. The heat exchanger 21 was used for generating the steam and for preheating natural gas while the heat exchanger 22 served to superheat the mixture of steam and natural gas before this mixture was fed to the steam reformer 7. The natural gas used as starting fuel was provided at a line pressure of 20 bar and the utilized water had a temperature of approximately 15 degrees Celsius. The ratio of steam to carbon (mol/mol) was 2.0. For the rest, the process parameters were selected corresponding to the following table. The corresponding reference numbers from FIG. 1 are used for the sake of clarity.

| | |
|---|---|
| low-pressure compressor (3a) inlet temperature | 15° C. |
| outlet temperature | 180° C. |
| outlet pressure | 4.5 bar |
| high-pressure compressor (3b) inlet temperature | 25° C. |
| outlet temperature | 203° C. |
| outlet pressure | 20 bar |
| recuperator (8) | |
| temperature increase of combustion air | 357° C. |
| temperature drop of exhaust gas | 327° C. |
| combustion chamber (5) | 690° C. |
| temperature increase due to combustion | |
| compressor drive turbine (2) inlet temperature | 1250° C. |
| pressure ratio at the turbine | 2.8 |
| outlet temperature | 970° C. |
| combustion chamber (6) | 280° C. |
| temperature increase due to combustion | |
| gas turbine (1) | |
| inlet temperature | 1250° C. |
| pressure ratio at the gas turbine | 6.4 |
| outlet temperature | 760° C. |
| generator (G) for generating electric current output | 3200 KW$_e$ |

-continued

| steam reformer (7) | |
| --- | --- |
| inlet temperature of the superheated fuel/ steam mixture | 550° C. |
| outlet temperature of the exhaust gas | 647° C. |
| outlet temperature of the product gas | 720° C. |
| fuel/steam superheater (22) inlet temperature fuel/steam mixture | 249° C. |
| outlet temperature of the exhaust gas | 610° C. |
| fuel preheater/steam generator (21) outlet temperature of the exhaust gas | 227° C. |

During the steam reformation of the natural gas which is substantially composed of methane, approximately 12 percent of the methane portion was not converted and was burned in the original form in the combustion chambers 5 and 6. With the exception of the energy for the compression of the natural gas which was already available with a sufficient line pressure, the entire energy requirement of the process was discovered from the process itself so that no further energy feed was effected from the outside. The overall efficiency achieved, i.e. the ratio of the generated electrical energy to the utilized energy quantity of fuel based on the lower thermal value was 65 percent and accordingly lay in a previously unachieved order of magnitude. The exhaust gas given off into the atmosphere was distinguished by a very low content of nitric oxides without the need for additional measures for denitrifying.

The great advantage achieved by the invention consists not only in that it enables a drastic increase in efficiency in the generation of mechanical energy from fuels based on hydrocarbon compounds, but also in that this can be combined simultaneously with a reduction of the content of harmful materials in the generated exhaust gas. In addition, the losses in connection with conventional large power station technology as a result of transporting steam over great distances and transforming the current are avoided to a great extent because of the special suitability of the devices according to the invention for local generation of electricity.

We claim:

1. A process for continuously converting energy that is chemically bound in a gaseous starting fuel essentially containing methane into usable mechanical energy, comprising the steps of:

compressing combustion air;

obtaining drive energy for the compression of the combustion air from a compressor drive gas turbine unit through which at least a flow volume of the compressed combustion air is conducted accompanied by partial expansion;

combusting fuel in two stages with the compressed combustion air to generate hot exhaust gases;

partially expanding the hot exhaust gas that is generated in a first of the combustion stages and has a high amount of excess air in the compressor drive gas turbine;

feeding the partially expanded exhaust gas to a second of the combustion stages with additional fuel;

expanding the hot exhaust gas generated in the second combustion stage in a gas turbine for producing usable mechanical energy;

endothermically converting the starting fuel at a temperature below 780° C., in a reaction space arranged after the gas turbine for producing usable mechanical energy, into a converted fuel having a higher absolute thermal value by heating the reaction space using the total flow of the hot exhaust gas generated in the combustion after the hot exhaust gas has been expanded in the gas turbine for producing usable mechanical energy, so that at least a predominant quantity of individual combustible components of the converted fuel remain for combustion;

using the converted fuel in the combusting steps; and heating the compressed combustion air prior to entering the first combustion stage using residual heat of the hot exhaust gas expanded in the gas turbine.

2. Process according to claim 1, comprising utilizing a composition of media introduced into the combustion stages for reducing nitric oxide development such that a flame temperature of less than 1700° C. results and the temperature at an inlet into the gas turbine is below 1250° C.

3. Process according to claim 2, comprising regulating a combustion chamber outlet temperature by spraying water or steam into the combustion chamber.

4. Process according to claim 1, comprising utilizing the residual heat of the hot exhaust gas expanded in the gas turbine for generating steam, superheating the steam by utilizing the hot exhaust gas flow which was previously at a higher temperature level, and using the steam for driving a steam turbine which generates usable mechanical energy.

5. Process according to claim 4, comprising superheating the generated steam prior to the inlet of the hot exhaust gas flow into the second combustion stage, and heating the reaction space for the endothermic reaction by using the hot exhaust gas flow exiting from the gas turbine before the gas is used for generating steam.

6. Process according to claim 1, comprising carrying out the endothermic reaction in the form of a steam reformation of C—H compounds.

7. Process according to claim 6, comprising removing a portion of the partially expanded steam from the gas turbine and guiding the portion into the steam reformation.

8. Process according to claim 6, wherein the endothermic reaction is a conversion of natural gas or biogas into synthesis gas.

9. Process according to claim 1, wherein the endothermic reaction is carried out at a temperature below 700° C.

10. Process according to claim 1, wherein the endothermic reaction is carried out at a temperature below 650° C.

11. A process for continuously converting energy that is chemically bound in a gaseous starting fuel essentially containing methane into usable mechanical energy, comprising the steps of:

compressing combustion air;

obtaining drive energy for the compression of the combustion air from a compressor drive gas turbine unit through which at least a flow volume of the compressed combustion air is conducted accompanied by partial expansion;

combusting fuel in two stages with the compressed combustion air to generate hot exhaust gases;

partially expanding the hot exhaust gas that is generated in a first of the combustion stages and has a high amount of excess air in the compressor drive gas turbine;

feeding the partially expanded exhaust gas to a second of the combustion stages with additional fuel;

expanding the hot exhaust gas generated in the second combustion stage in a gas turbine for producing usable mechanical energy;

endothermically converting the gaseous starting fuel at a temperature below 780° C., in a reaction space arranged after the gas turbine for producing usable mechanical energy, into a converted fuel having a higher absolute thermal value by heating the reaction space using the total flow of the hot exhaust gas generated in the combustion after the hot exhaust gas has been expanded in the gas turbine for producing usable mechanical energy, so that at least a predominant quantity of individual combustible components of the converted fuel remain for combustion; and using the converted fuel in the combusting stages.

12. A process according to claim 11, and further comprising the step of heating the compressed combustion air prior to entering the first combustion stage using residual heat of the hot exhaust gas expanded in the gas turbine.

13. A process for continuously converting energy that is chemically bound in a gaseous starting fuel essentially containing methane into usable mechanical energy, comprising the steps of:

compressing combustion air;

obtaining drive energy for the compression of combustion air from a compressor drive gas turbine unit through which at least a flow volume of the compressed combustion air is conducted accompanied by partial expansion;

combusting fuel in two stages with the compressed combustion air to generate hot exhaust gases;

partially expanding the hot exhaust gas that is generated in a first of the combustion stages and has a high amount of excess air in the compressor drive gas turbine;

feeding the partially expanded exhaust gas to a second of the combustion stages with additional fuel;

expanding the hot exhaust gas generated in the second combustion stage in a gas turbine for producing usable mechanical energy;

endothermically converting the starting fuel at a temperature below 780° C., in a reaction space, into a converted fuel having a higher absolute thermal value by heating the reaction space using the hot exhaust gas before the hot exhaust gas is partially expanded in the compressor drive gas turbine, so that at least a predominant quantity of individual combustible components of the converted fuel remain for combustion; and using the converted fuel in the combustion stages.

14. A process for continuously converting energy that is chemically bound in a gaseous starting fuel essentially containing methane into usable mechanical energy, comprising the steps of:

compressing combustion air;

obtaining drive energy for the compression of the combustion air from a compressor drive gas turbine unit through which at least a flow volume of the compressed combustion air is conducted accompanied by partial expansion;

combusting fuel in two stages with the compressed combustion air to generate hot exhaust gases;

partially expanding the hot exhaust gas that is generated in a first of the combustion stages and has a high amount of excess air in the compressor drive gas turbine;

feeding the partially expanded exhaust gas to a second of the combustion stages with additional fuel;

expanding the hot exhaust gas generated in the second combustion stage in a gas turbine for producing usable mechanical energy;

endothermically converting the starting fuel at a temperature below 780° C., in a reaction space, into a converted fuel having a higher absolute thermal value by heating the reaction space using the hot exhaust gas generated in the combustion after being partially expanded in the compressor drive gas turbine unit, but before being expanded in the gas turbine, so that at least a predominant quantity of individual combustible components of the converted fuel remain for combustion; and using the converted fuel in the combustion stages.

15. A process for continuously converting energy that is chemically bound in a gaseous starting fuel essentially containing methane into usable mechanical energy, comprising the steps of:

compressing combustion air;

obtaining drive energy for the compression of the combustion air from a compressor drive gas turbine unit through which at least a flow volume of the compressed combustion air is conducted accompanied by partial expansion;

combusting fuel in two stages with the compressed combustion air to generate hot exhaust gases;

partially expanding the hot exhaust gas that is generated in a first of the combustion stages and has a high amount of excess air in the compressor drive gas turbine;

feeding the partially expanded exhaust gas to a second of the combustion stages with additional fuel;

expanding the hot exhaust gas generated in the second combustion stage in a gas turbine for producing usable mechanical energy;

endothermically converting the starting fuel at a temperature below 780° C., in a reaction space, into a converted fuel having a higher absolute thermal value by heating the reaction space before expanding the hot exhaust gas generated in the combustion, so that at least a predominant quantity of individual combustible components of the converted fuel remain for combustion; and using the converted fuel in the combusting stages.

* * * * *